United States Patent
Tieben et al.

(10) Patent No.: US 11,858,192 B2
(45) Date of Patent: Jan. 2, 2024

(54) SEALING DEVICE

(71) Applicant: KRAUSSMAFFEI EXTRUSION GMBH, Hannover (DE)

(72) Inventors: Michael Tieben, Hannover (DE); Sven Schussky, Barsinghausen (DE)

(73) Assignee: KRAUSSMAFFEI EXTRUSION GMBH, Hannover (DE)

( * ) Notice: Subject to any disclaimer, the term of this patent is extended or adjusted under 35 U.S.C. 154(b) by 119 days.

(21) Appl. No.: 17/636,072

(22) PCT Filed: Aug. 25, 2020

(86) PCT No.: PCT/EP2020/073714
§ 371 (c)(1),
(2) Date: Feb. 17, 2022

(87) PCT Pub. No.: WO2021/043629
PCT Pub. Date: Mar. 11, 2021

(65) Prior Publication Data
US 2022/0355528 A1    Nov. 10, 2022

(30) Foreign Application Priority Data

Sep. 4, 2019   (DE) ..................... 10 2019 123 606.1

(51) Int. Cl.
*B29C 48/25*    (2019.01)
*B33Y 80/00*    (2015.01)

(52) U.S. Cl.
CPC ........ *B29C 48/254* (2019.02); *B29C 48/2522* (2019.02); *B33Y 80/00* (2014.12)

(58) Field of Classification Search
CPC .... B29C 48/254; B29C 48/2522; B33Y 80/00
See application file for complete search history.

(56) References Cited

U.S. PATENT DOCUMENTS 4,257,617 A    3/1981 Hill
2021/0308644 A1*   10/2021 Araújo Carreira ...... C10G 1/10

FOREIGN PATENT DOCUMENTS

CN   108361109 A  *  8/2018 ............... F01D 5/34
DE   102015211917 B3    8/2016
(Continued)

OTHER PUBLICATIONS

International Search Report for PCT/EP2020/073714 dated Nov. 19, 2020.
Written Opinion for PCT/EP2020/073714 dated Nov. 19, 2020.

*Primary Examiner* — Gilbert Y Lee
(74) *Attorney, Agent, or Firm* — Pearne & Gordon LLP

(57) ABSTRACT

A sealing device for sealing off the intermediate space between a housing and a shaft which is mounted rotatably in the housing, which housing has a first plate-like body with a front side, a rear side and a first opening extending from the front side to the rear side and suitable for the leadthrough of the shaft, and has a line which runs in the body and which is suitable for conducting a liquid or gaseous medium. Here, the first body is suitable for being fastened sealingly to the housing such that the shaft which is rotatably mounted in the housing is led through the first opening. The line has a multiplicity of outlets which are connected to an inlet via at least one diversion and/or at least one divergence and which lead radially symmetrically into the first opening. The first opening is suitable for the introduction of first sealing such that the first sealing seals off an intermediate space between the shaft and the first body without blocking the outlets of the line.

11 Claims, 2 Drawing Sheets

(56) References Cited

FOREIGN PATENT DOCUMENTS

| DE | 102017216463 A1 | 3/2019 |
|----|-----------------|--------|
| EP | 2842716 A1 | 3/2015 |
| JP | S5513072 U | 1/1980 |

\* cited by examiner

SEALING DEVICE

CROSS-REFERENCE TO RELATED APPLICATIONS

This is a National Stage application of PCT international application PCT/EP2020/073714 filed on Aug. 25, 2020, which claims the priority of German Patent Application No. 10 2019 123 606.1, filed Sep. 4, 2019, which are incorporated herein by reference in their entireties.

FIELD OF THE INVENTION

The present invention relates to a sealing device for sealing off rotatably mounted shafts. In addition, the present invention relates to a method for producing such sealing devices.

BACKGROUND OF THE INVENTION

In a variety of machines, shafts are used for the transmission of rotational movements. In particular, it is known to use drive shafts for the rotating of mixing devices. For this, the drive shafts are directed out from a gearing and/or motor into a housing in which they are connected to the mixing devices, in order to move these. An example for such machines are extrusion systems, in which extruder screws rotating in a housing thoroughly work or respectively mix an extrusion mass. Such extruder screws are connected to a drive shaft which projects from the housing of the extrusion system.

JP S55 13072 U relates to a sealing device for a screw bearing section of an extrusion moulding machine.

In such mixing devices, an intensive dust generation can occur owing to the mixing process (e.g. owing to abrasion) or owing to the materials which are used for the mixing (e.g. materials or mixing additives in powder form, such as for instance chalk, talcum or colour powder). Without sealing off the intermediate space between the housing of the mixing device and the shaft projecting from the housing, an intensive contamination would occur during operation. In addition, exiting dusts can be hazardous to health or can also lead to damaging of the motor, the gearing or respectively of the drivetrain owing to excessive dust deposition.

Typically, various sealing concepts are used for such seals. On the one hand, different sealing types can be used, such as for instance radial shaft sealing rings, O-rings, stuffing box packings or suchlike. On the other hand, sealing media such as for instance air, grease, water, or suchlike, can be introduced into the intermediate space, in order to prevent an exit of dust. However, it is also known to combine the use of different sealing types and/or sealing media, for example by two radial shaft sealing rings being combined with an additional sealing water supply.

Such a combination of sealing means and sealing media is carried out in particular when the sealing performance must be high and/or the wear within the seal must be low. In so far as a combination of sealing means and sealing medium is sought, typically here the feeding of the sealing medium is realized via several bores which are introduced from the exterior into the surrounding housing.

This procedure entails various disadvantages, however. Thus, for instance, a combination of sealing means and sealing medium can only come into use when the available installation space also allows the required bores to be able to be carried out from the exterior into the surrounding housing. A usual combination of sealing means and sealing medium therefore requires that the seal can be achieved with a conventional drill.

In addition, the case frequently arises that the installation space is indeed sufficiently great, but the sealing medium must be diverted within the housing. For this, several bores would have to be introduced into the housing, which meet within the housing. On the one hand, this imposes high demands with regard to manufacturing technique. On the other hand, through the drilling process here, shavings can arise in the bores which can not be removed due to lack of accessibility and which have a negative influence on the flow behaviour sealing medium. Also, except for the bore which is provided for the feeding of the sealing medium, all the bores must be closed from the environment by a stopper after manufacture, in order to prevent an unwanted exit of the sealing medium. As this entails an additional manufacturing step, additional costs are generated hereby.

For this reason, it is usual to dispense with several bores in the housing. The feeding in of the sealing medium then takes place, however, only at one point of the shaft, i.e. via only one channel, in order to keep as small as possible the manufacturing effort by machining. However, this leads to the sealing medium not being able to be directed to the shaft radially symmetrically, whereby the sealing performance can be impaired.

BRIEF SUMMARY OF THE INVENTION

It is an object of the present invention to create a sealing device for sealing off an intermediate space between a housing and a shaft which is mounted rotatably in the housing (such as e.g. an extruder screw shaft), with which the above-mentioned disadvantages do not occur. A sealing device is therefore to be created which enables a combination of sealing means and a sealing medium irrespective of the available installation space. Here, the sealing medium is to be able to be directed to the shaft radially symmetrically, without being impeded in its flow by residues resulting from a production method of the sealing device.

This problem is solved by the subject of the independent claims. Advantageous further developments are defined in the dependent claims.

Thus, such a sealing device can have a first plate-shaped body with a front side, a rear side and a first opening which extends from the front side to the rear side and is suitable for the leadthrough of the shaft. In addition, the sealing device has a line running in the body, which is suitable for conducting a liquid or gaseous medium. Here, the first body is suitable for being fastened sealingly to the housing such that the shaft which is rotatably mounted in the housing is directed through the first opening. The line can have a multiplicity of outlets which are connected to an inlet via at least one diversion and/or at least one divergence and which lead radially symmetrically into the first opening. The first opening is suitable here for the introduction of first sealing means such that the first sealing means seal off an intermediate space between the shaft and the first body, without blocking the outlets of the line.

Instead of directing the feeding of the sealing medium, i.e. a gaseous or liquid medium suitable for sealing, such as for instance air, water or grease, directly through the housing, a sealing plate is therefore provided, which can be mounted on a part of the housing leading to the drivetrain of the shaft. This takes place here in a sealing and flush manner, i.e. such that the connection between housing and sealing plate (i.e. the first plate-shaped body) is tight with respect to the material which is to be sealed and does not permit an exiting of the material. Further components can also be arranged between the housing and the first body, if this is advantageous, as long as these do not impair the sealing characteristics.

The shaft projecting from the housing can be directed in this position of the first body through the opening which is contained therein. The problem of sealing the intermediate space between housing and shaft is thereby shifted to the problem of sealing between the shaft and the first body, i.e. the sealing plate.

This makes it possible to introduce into the opening the means necessary for the sealing, such as sealing means and sealing medium, instead of providing for a direct sealing in the housing. Thereby, the problems connected with lack of installation space at the housing are circumvented, because the sealing device, or respectively the sealing plate or the first body, can be formed with means suitable for this, independently of the housing.

In particular, this makes it possible to configure the first body such that a line can be directed from a single inlet by divergence and/or diversion of the line, to several outlets which open out radially symmetrically at side walls of the opening and are thus suitable to deliver the sealing medium to the shaft radially symmetrically.

At the same time, in a known manner, e.g. by tapering or gradation, the opening can be suitable for sealing means used in a conventional manner for the sealing of shafts to be able to be inserted into it without blocking the outlets of the sealing medium line. For example, a press seal or stuffing box packing can be formed at a gradation of the opening in order to create a seal between first body and shaft, which then realizes the seal between shaft and housing together with the sealing medium which is introduced via the line. Likewise, other sealing means such as for instance O-rings, radial shaft sealing rings or suchlike, could be able to be fastened in a suitable manner in and/or at the opening, in order to produce the seal.

Ideally, the sealing medium can be acted upon by pressure with respect to the sealing means which are introduced in such a way, i.e. normally the sealing means alone are sufficient in order to prevent an exiting of the material which is to be sealed. However, if during operation it occurs that the shaft is displaced slightly from its normal position, this can lead to a brief leakage of the sealing means. In this case, however, the sealing medium, which is under pressure, will flow into the leaky region between first body and sealing means and owing to its flow direction and/or its viscosity it will prevent an exiting of the material which is to be sealed. Alternatively, the sealing medium can also lie against the sealing means without pressure. Then a material exiting from the housing is caught in the sealing medium, which typically has a higher viscosity than the exiting material. In this case, the sealing medium can also be arranged in front of the sealing means.

The first body can consist here of several individual components. For example, the first body can consist of two plates. The line can be milled on a surface of the first plate. The second plate is then applied onto the first plate in a sealed manner, e.g. welded on or screwed on/riveted in a flush manner. In this way, the line is produced in the first body without the need to carry out several bores.

Alternatively, the first body can be formed in one piece, i.e. the first body consists of only one component without subcomponents. This can be achieved by means of additive manufacture. In particular, the first body can be produced by 3D printing. The line and the opening are therefore left free here directly in the manufacture of the first body. A need to produce the line or the opening by milling or drilling does not exist.

The production by means of additive manufacturing methods has the advantage that the form and position of the lines and of the opening are able to be selected entirely freely, both with regard to the course and also the cross-section. In addition, there is no risk that shavings or suchlike clog the lines, as these are produced without machining methods. In particular, the lines can have any desired cross-section, e.g. round, oval or angular and can change this according to requirements. The cross-section area can also change within the line. Likewise, it is possible to realize any desired advantageous line directing, therefore in particular to carry out any desired number of diversions and/or branches or respectively divergences. Hereby, the pressure drop within the line can be set optimally, which leads to a smaller consumption of sealing medium and/or to a saving of energy.

The first body can be produced from any material which has a sufficient strength for use as a sealing plate. The first body is preferably made from metal, e.g. from aluminium.

The sealing device can also have the first sealing means, in addition to the first body, wherein the first sealing means are arranged with respect to the outlets of the line on the side at which the first body is connected to the housing. This has the advantage that a flowing out or respectively exiting of the material which is to be sealed can be effectively prevented through the combination of first sealing means and sealing medium which is introduced through the line.

The sealing device can have, furthermore, second sealing means which seal off an intermediate space between the shaft and the first body, without blocking the outlets of the line, wherein the outlets are arranged between the first sealing means and the second sealing means. Hereby, the sealing medium, advantageously acted upon by pressure, can be introduced between the two sealing means. The sealing medium then only exits from the region between sealing means and first body when one of the sealing means loses its tightness e.g. by a brief imbalance of the shaft, and thereby enables the exit. In addition to an improvement to the tightness of the sealing device, this also allows the consumption of sealing medium to be reduced. Additionally, the pressure present in the sealing medium can be monitored, e.g. by a pressure sensor connected to the line. This allows the tightness of the sealing device to be monitored, because in the case of a constant pressure loss it must be assumed that at least one of the sealing means has become leaky. Hereby, a selective maintenance of the sealing device can be realized with readjusting or respectively exchanging of the sealing means.

The first sealing means and/or the second sealing means can be formed as a stuffing box. This is a sealing for rotatable shafts which is simple to realize. In addition, a stuffing box permits a readjusting of the seal in the case of incipient leakage. The sealing means can thus remain in operation as long as possible without having to be exchanged.

Furthermore, the sealing device can have a second plate-shaped body with a second opening, which is suitable for being connected sealingly to the first body at a side of the first body facing away from the housing, such that the first opening and the second opening overlap one another and allow the shaft to be directed through them. The second opening is suitable here for introducing the second sealing means such that the second sealing means seal an intermediate space between the shaft and the second body without blocking the outlets of the line.

Therefore, a second sealing plate or respectively a second body can be applied onto the first body such that the first opening is extended through the second opening. The fastening of the second body to the first body takes place here such that the material which is to be sealed can not exit between the first and the second body. The sealing of the first body with respect to the shaft, which takes place by the second sealing means, can therefore also take place in the region of the second body. The line is situated here in the first body. Alternatively, however, it can also be situated in the second body, as long as the line outlets are not blocked by the second sealing means. The second body can also have its own line system. In this way, the structure of the sealing device can be configured more flexibly, and the sealing efficiency can be further improved.

The first body can have a third opening, which is suitable for the leadthrough of a further shaft. This allows the sealing device to also be used for devices which have several, in particular parallel, shafts. In particular, such a sealing device is suitable for use in multi-shaft extruders.

The sealing device which is configured in such a way can have, furthermore, a third body which is constructed like the first body and is suitable to be connected sealingly to the first body such that the first opening of the first body overlaps with the third opening of the third body and permits the leadthrough of the shaft, and that the third opening of the first body overlaps with the first opening of the third body and permits a leadthrough of the further shaft.

The first and third body are therefore substantially identical in construction, i.e. they have the same types of openings and lines. Both bodies have an opening (first opening) in which line outlets for a sealing medium are arranged, and a further opening (third opening). A shaft can be directed through both openings. The openings with the line outlets, however, do not lie over one another, but rather are respectively assigned to another shaft. Hereby, a seal can be realized in the manner described above for two shafts which run in parallel, as are present e.g. in twin-screw extruders. This is particularly advantageous because in such devices, through interaction of the medium, which is to be mixed, with the extruder screws which are connected to the shafts, forces act on the shafts which press these apart. A brief leakage, described above, of sealing means therefore occurs relatively frequently in twin-screw extruders. This can be efficiently remedied by the sealing device with first and third body, described above, by an exit of the material which is to be sealed being caught by sealing medium.

It is likewise conceivable to provide several openings with line systems for a sealing medium in a sealing plate, as were described above. Hereby also multi-shaft systems with any desired number of shafts can be sealed effectively. In addition, several sealing plates, as were described above, can be used, with corresponding supplementation of through-openings, fastened on one another for the sealing of systems with any desired number of shafts.

An extrusion device can have an extrusion screw rotatably mounted in a housing by means of a shaft, and a sealing device for sealing the intermediate space between the housing and the shaft, as was described above. Such an extrusion device is therefore effectively sealed against the exiting of extrudate and/or of, in particular pulverulent, mixing additives, in the direction of the screw drive.

A multi-screw extrusion device can have two extrusion screws mounted rotatably in a housing by means of a first shaft and a second shaft, and a sealing device for several shafts, as was described above. Hereby, multi-screw extruders can be sealed in an effective manner against the exiting of extrudate and/or of, in particular pulverulent, mixing additives in the direction of the screw drive.

A method for the production of a sealing device, as was described above, can comprise: producing the first body by means of an additive production method, in particular by means of 3D printing. As described above, this allows the sealing device to be produced in a manner which is efficient and fit to use as possible.

A computer program product, with execution on a device for additive manufacture, can cause the device for additive manufacture to carry out the above method.

BRIEF DESCRIPTION OF THE DRAWINGS

The invention is to be explained in detail below with reference to the enclosed figures. It is self-evident that this description is only by way of example. The subject of the invention is defined solely through the claims. There are shown:

DESCRIPTION OF EXAMPLE EMBODIMENTS

The present invention is explained below with reference to a sealing device 100 for a twin-screw extruder. However, the invention is not to be restricted hereby. In particular, the generalisation of the following description to sealing devices for extruders with only one or more than two screws and also the generalization to sealing devices for other machines which have one or more shafts which are to be sealed with respect to a housing, is to be included by the invention, in so far as it falls within the subject of the claims.

Figure 1:
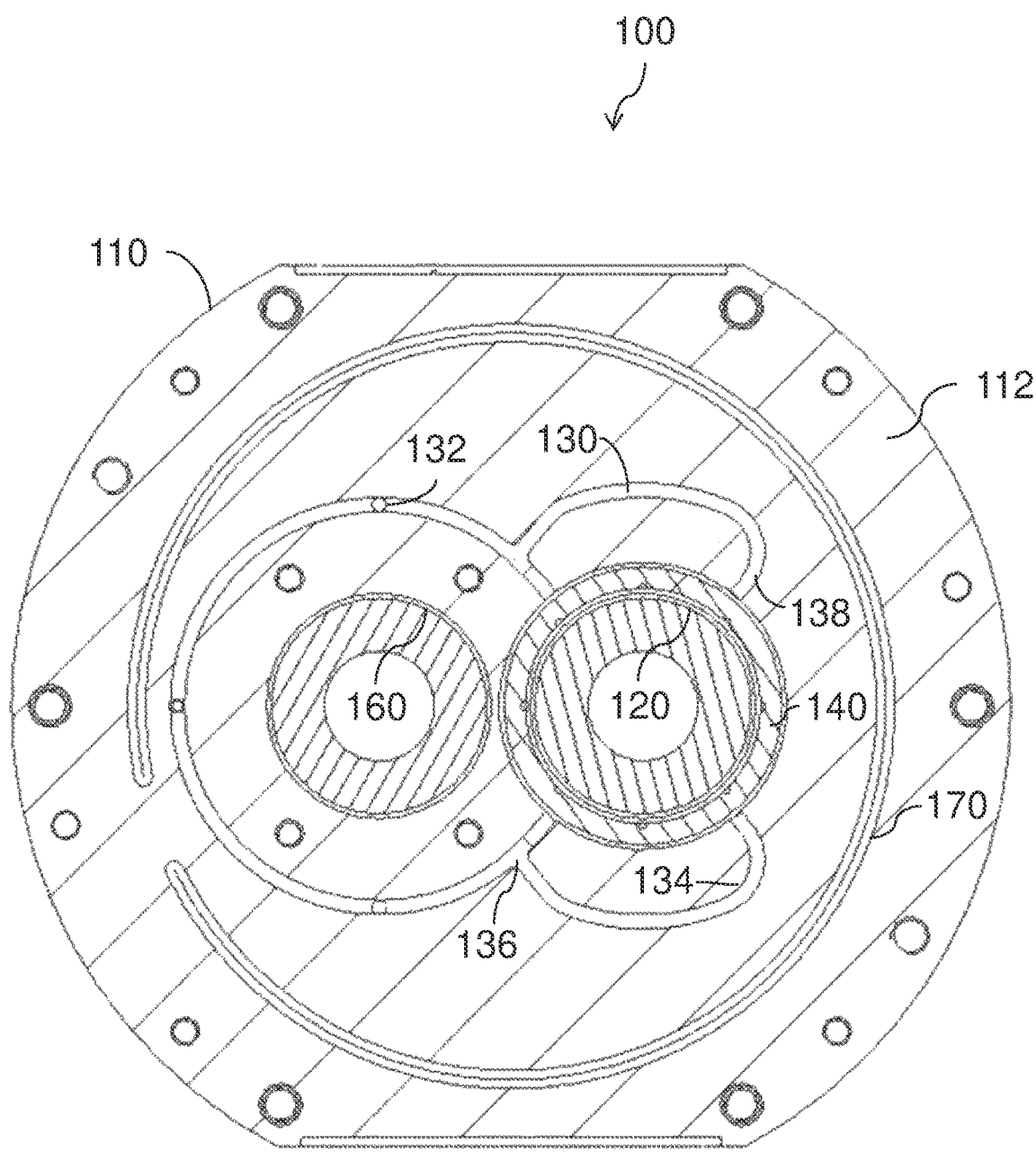
FIG. 1 a schematic view of a sealing device.

FIG. 1 shows a schematic view of the sealing device 100 for sealing an intermediate space between a housing and a shaft which is rotatably mounted in the housing.

The sealing device 100 has a plate-shaped first body 110. The sealing device 100 can consist substantially of the first body 110. However, as explained below by way of example with reference to FIG. 2, it can also be constructed from several components.

The first body 110 is formed as a cover plate, i.e. its extent in two directions is greater than its extent in the third direction. The first body 110 is configured here such that it can be mounted in a secure and flush manner, e.g. by screw connections, riveting, welding or suchlike, on a surface of the housing which is to be sealed. The surface of the first body 110, which comes in contact with the housing, can be configured in any desired manner here, as long as it is guaranteed that the contact between housing and first body 110 is tight such that materials exiting from the housing can not escape along the connection between housing and first body 110. In this way, it is achieved that the desired sealing between housing and shaft can also be produced between the first body 110 and the shaft.

The sealing between housing and first body 110 can take place here in any desired known manner, e.g. by pure press connection of components lying against one another by means of screwing, riveting or suchlike, by additional sealing means, such as for instance rubber sealing elements, or sealing media, such as grease for instance, or else through a welding of first body 110 and housing.

As is explained with reference to FIG. 1, further components can also be arranged between the housing and the first body 110, as long as the connection of the housing to the first body 110 (including the further components) is tight as a whole.

The first body 110 can consist here of any sufficiently strong material which is suitable to be formed in the form described further below, and which can be connected to the housing. In particular, the first body 110 can consist of a metal such as aluminium, for instance. However, the first body 110 can also be made from a sufficiently hard plastic or from ceramic.

In the first body 110 a (first) opening 120 is provided, which extends between a rear side and a front side of the first body 110. The first opening 120 is sufficiently large that the shaft projecting out from the housing can be directed through it when the sealing device 100 or respectively the first body 110 are connected to the housing. For example, the opening 120 can have a diameter of 10 to 100 cm or more, for instance 20, 40, 60 or 80 cm. The first opening 120 therefore allows the shaft to rotate when the sealing device 100 and the housing of the shaft are connected to one another.

Through the fixed and tight connection of housing and first body 110 a region from which the material which is to be sealed (e.g. a powder, such as chalk, talcum or a colour powder), situated in the housing, can exit, shifts to the intermediate space between first body 110 and the shaft. Therefore, for sealing, it is sufficient to seal the region of the opening 120 which is not filled by the shaft.

For this, the first body 110 has a line 130 or respectively a line system formed by the line 130, in which a sealing medium, in particular a gaseous or liquid sealing medium, such as for instance air, water or grease, can be directed to the opening 120. The line 130 can have here any desired cross-section suitable for directing the desired sealing medium, which cross-section can also change in its shape and its area. The diameter of the line 130 can lie in the range of 1 mm to 20 mm, and can be e.g. 2 mm, 5 mm, 10 mm or 20 mm.

The line 130 has one or more inlets 132, via which the sealing medium can be introduced into the line 130. In FIG. 1, three such inlets 132 are shown. However, it is self-evident that any desired expedient number can be used, in particular also only one inlet 132. The inlets 132 can be situated both on the front side and also on the rear side of the first body 110. The feed of the sealing medium can therefore take place from the exterior, i.e. via the side of the first body 110 facing away from the housing.

However, it can also take place via lines arranged in the housing or in intermediate components. The inlets 132 are situated then in the side of the first body 110 facing the housing. The inlets or respectively the inlet 132 can, however, also be situated on the side of the first body 110.

From the inlets 132, the line 130 extends via diversions 134 and divergences or respectively branches 136 to outlets 138, via which the sealing medium can be brought to the shaft which is directed through the opening 120. The diversions 134 and divergences 136 serve to surround the shaft with the sealing medium in as radially symmetrical a manner as possible. The line 130 is therefore formed such that the outlets 138 are arranged radially symmetrically to the shaft axis. Thus, in FIG. 1 the four outlets 138 are respectively offset to one another by 90°. The number of the outlets 138 can be as desired. Preferably it is greater than one, in order to guarantee a uniform feed of sealing medium. However, a sealing device 100 with only one outlet 138 is also conceivable.

The combination of first opening 120 and line 130, described above, in a plate-shaped first body 110 constitutes the basic principle of the sealing device 100. Hereby, a simple sealing of a shaft rotating in a housing can be achieved. Even if this is not shown below in the figures, this combination can be used alone for an individual shaft. Likewise, it would be possible to accommodate several such combinations in a single sealing plate, in order to seal off several shafts.

Alternatively, as explained below with reference to FIG. 2, several sealing plates, which are formed in accordance with the first body 110, can be mounted over one another (or behind one another), in order to seal off several shafts.

For this purpose, as shown in FIG. 1, a further (third) opening 160 can be provided, through which a further shaft can be directed. This further opening 160 is not, however, provided with outlets 138, i.e. no sealing medium can be introduced into the further opening 160 from the line 130 provided in the first body 110.

In addition to the above-mentioned components, a cooling line 170 can also be provided in the first body 110, in order to dissipate frictional heat which has occurred owing to the rotational movement of the shaft.

The first body 110 can be formed in one piece, as shown in the figures, i.e. the first body 110 is not formed from various components. In particular, the first body 110 can be produced in an additive manufacturing method, such as 3D printing. This has the advantage that the line 130 and the openings 120, 160 can have a far more flexible and almost any desired form. In addition, through the dispensing of machining manufacturing techniques, such as drilling or milling, shavings are prevented from blocking the line 130 entirely or partially. Preferably, the first body 110 then consists of a metal, aluminium for instance.

However, it is also possible to compose the first body 110 from several components. The line 130 can then also be produced with machining methods, e.g. by milling on the surface of a component, which is then covered by another component.

In order to keep the sealing medium, exiting from the outlets 138, within the opening 120 on the shaft, the opening 120 is configured such that a (first) sealing means 140 can be inserted therein, which seals off the opening 120 completely in the region between first body 110 and the shaft, without covering the outlets 138. A further (second) sealing means can likewise be arranged for example in the opening 120 (without covering the outlets 138), in order to prevent an exiting of the sealing medium from the opening 120. However, the opening 120 can also be sealed off in another way against such an exiting, e.g. by sealing means applied in a flat manner on the first body 110, through which the shaft projects, or by a sealing means which is held in its position by a further component or sealing plate.

The sealing means 140 is arranged with respect to the outlets 138 preferably on the side of the sealing device 100 facing the housing. It therefore serves as first sealing for material exiting from the housing. The sealing means 140 can adopt any desired form here which is suitable for sealing off the intermediate space between the first body 110 and the rotating shaft. For example, the sealing means 140 can be an O-ring, a radial shaft sealing ring or suchlike or else a combination thereof. Preferably, the sealing means 140 is configured as a stuffing box, as this permits a readjusting in the event of leakage. The sealing means 140 typically consists of rubber, caoutchouc or suchlike. The opening 120 can then be configured e.g. in a graduated manner, in order to enable a pressing in and hence spreading open of the sealing means 140 against the gradation, whereby the sealing means 140 is pressed against the rotatable shaft and thus improves the sealing.

With a running shaft, it can always occur that the shaft shifts perpendicularly to the rotation axis. This leads to a squeezing of the sealing means 140 whereby a small leaky region can occur between sealing means 140 and shaft or between sealing means 140 and first body 110. The material which is to be sealed, situated in the housing, can exit through this region. However, it is then caught by the sealing medium in the opening 120.

In addition, with provision of a further sealing means on the other side of the outlets 138, the sealing medium can be introduced under pressure in the intermediate space between the sealing means. The occurrence of a leaky region at one of the sealing means then leads to the sealing means flowing into the region and hence preventing the material, which is to be sealed, from exiting.

Pressure sensors connected to the line can establish the pressure drop connected therewith. This makes it possible to monitor the tightness of the sealing, in order to promptly initiate a repair or a replacement of the sealing device 100.

However, the sealing means 140 can also be able to be inserted into the opening 120 on the side of the sealing device 100 facing away from the housing, and to be held there e.g. by a gradation. Also in this case an improved sealing is achieved through the combination of sealing medium and sealing means 140. The sealing medium is then held in the opening by a further sealing means e.g. lying on the first body 110, which is arranged between the first body 110 and the housing.

With the sealing device 100 shown in FIG. 1 it is therefore possible to solve the above-mentioned problems. A sealing medium can be directed in a line which is arranged in a sealing plate without machining methods and without lack of space, radially symmetrically into an opening in which it seals the region around a rotatable shaft. In addition, the opening can receive sealing means or can be sealable by sealing means which hold the sealing medium between them. Thereby, a durable and reliable sealing is achieved.

Figure 2:
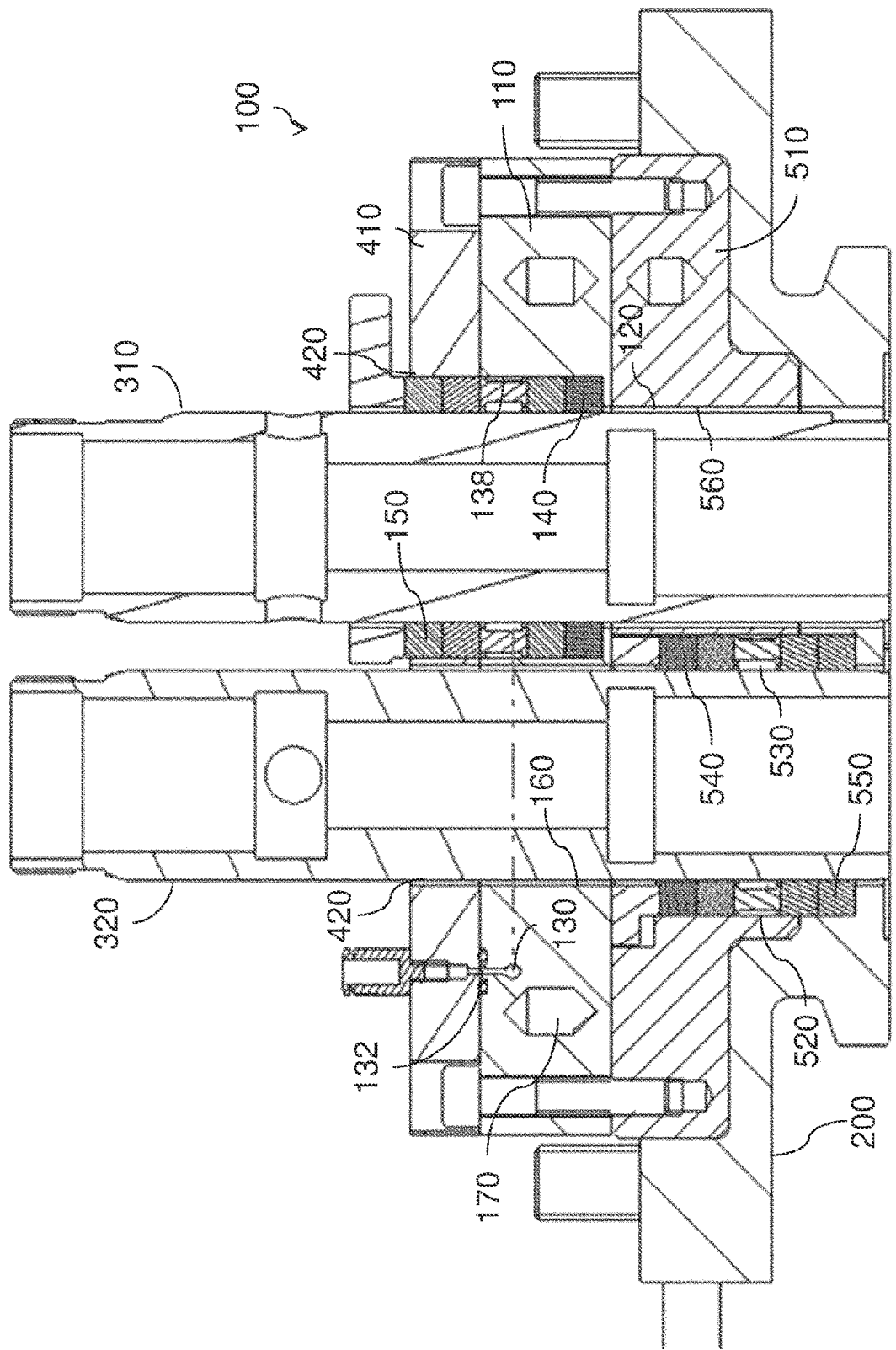
FIG. 2 a schematic view of a further sealing device.

FIG. 2 shows schematically an arrangement of the sealing device 100 of FIG. 1 which is supplemented by further components, on a housing 200, e.g. a twin-screw extrusion device. The sealing device 100 of FIG. 1 is suitable for the sealing of a first shaft 310 and a second shaft 320, which in the housing 200 drive two extruder screws of the extrusion device.

In addition to the first body 110, described above, with the first opening 120, the sealing device 100 in the example of FIG. 2 has a second body 410 with two second openings 420 and a third body 510, which is configured substantially like the first body 110. The first body 110 is connected here in the direction of the housing 200 on the third body 510 and oppositely with the second body 410. The sealing device 100 is connected to the housing 200 via the third body 510. As shown in FIG. 2, the individual components can be fastened to one another by means of screw connections. However, any other fastening method is also possible, such as e.g. welding.

The first shaft 310 is directed in the manner described above through the first opening 120 of the first body 110. The first opening 120 has a gradation in the direction of the housing 200, at which the first sealing means 140 sits firmly. The outlets 138 of the line 130 are arranged following thereafter, via which the sealing medium is fed into the opening 130. The first shaft 310 then runs through a second opening 420 in the second body 410 and from there to the gearing (not shown). This second opening 420 (alternatively the first opening 120 or both openings in cooperation) holds a second sealing means 150, which together with the first sealing means 140 delimits a region of the first opening 120 and holds the sealing medium therein. This sequence enables a reliable sealing of material which is to be sealed, exiting form the housing 200 along the first shaft 310.

A similar sequence of sealing means and line outlets is provided through the interaction of the housing 200 and of the third body 510 for the second shaft 320. The third body 510 has a first opening 520 corresponding to the first opening 120 of the first body 110, through which the second shaft 320 projects. Third sealing means 540, corresponding to the first sealing means 140 are fixed at a gradation in the first opening 520 of the third body 510. These and fourth sealing means 550 corresponding to the second sealing means 150 enclose outlets of a line 530, formed in the third body 510, opening out in the first opening out in the first opening 520 of the third body 510. The line 530 of the third body 510 can be connected here with the line 130 of the first body 110, or can have its own inlet for an (also further) sealing medium. The fourth sealing means 550 are held here by a recess in the housing 200 and/or the first opening 520 of the third body 510.

The second shaft 320 then runs further through the third opening 160 of the first body 110 and through a further second opening 420 in the second body 410, without having to be sealed once again. From there, the second shaft runs to the gearing (not shown).

For the first shaft 310 a third opening 560 of the third body 510, through which the first shaft 310 also runs, without being sealed, corresponds to the third opening 160 of the first body 110.

The first, second and fourth sealing means 140, 150, 540, 550 described above can all be of the same type and formed e.g. as an O-ring, radial shaft sealing ring, press seal or stuffing box packing. The sealing means 140, 150, 540, 550 can, however, also be configured differently, if this were necessary e.g. for reasons of manufacturing technique or for reasons of cost. Likewise, the combination of different sealing types for a sealing means is possible.

As with the first body 110, the third body 510 can be produced in one piece by means of additive manufacture, whereas the second body 410 is preferably manufactured in a conventional manner, as it does not have a branching line system like the first body 110 and the third body 510. The feed to the line inlet 132 shown on the gearing side in the second body 410 can be produced here by a bore. However, it is also possible to produce first and third body or else all three bodies in one piece by means of additive manufacture.

Through the sealing device, shown in FIG. 2, an effective sealing can be achieved for a multi-shaft extrusion device, by the sealing being shifted from the housing of the extrusion device into a sealing plate which is to be fastened on the housing. This is preferably produced by means of 3D printing in order to guarantee a uniform and therefore better sealing feeding in of sealing medium to the shaft.

The above-mentioned components of the sealing device can all be realized by means of computer program products which are known in principle and are suitable for additive manufacture, e.g. files for 3D printing, when these are executed on a device for additive manufacture. This makes it possible to produce the sealing devices in a decentralized manner.

LIST OF REFERENCE NUMBERS 100 sealing device
110 first body
120 first opening of the first body 130 line in the first body
132 inlet of the line in the first body
134 diversion of the line in the first body
136 divergence of the line in the first body
138 outlet of the line in the first body
140 first sealing means
150 second sealing means
160 third opening of the first body
170 cooling line
200 housing
310 (first) shaft
320 (second) shaft
410 second body
420 second opening
510 third body
520 first opening in the third body
530 line in the third body
540 third sealing means
550 fourth sealing means
560 third opening in the third body

What is claimed is:

1. A sealing device (100) for sealing off the intermediate space between a housing (200) and a shaft (310) which is rotatably mounted in the housing, having:
a first plate-shaped body (110) with a front side, a rear side and a first opening (120), which extends from the front side to the rear side and is suitable for the leadthrough of the shaft (310);
a line (130) running in the body (110), which is suitable for conducting a liquid or gaseous medium;
first sealing means (140);
wherein
the first body (110) is suitable to be fastened sealingly to the housing (200), such that the shaft (310) which is rotatably mounted in the housing (200) is directed through the first opening (120);
the line (130) has a multiplicity of outlets (138) which are connected to an inlet (132) via at least one diversion (134) and/or at least one divergence (136), and which lead radially symmetrically into the first opening (120);
the first opening (120) is suitable for the introduction of first sealing means (140) such that the first sealing means (140) seal off an intermediate space between the shaft (310) and the first body (110), without blocking the outlets (138) of the line (130); and
the first body (110) is formed in one piece; and
the first sealing means (140) are arranged with respect to the outlets (138) of the line (130) on the side at which the first body (110) is connected to the housing (200).

2. The sealing device (100) according to claim 1, wherein the first body (110) is produced by means of an additive manufacturing method.

3. The sealing device (100) according to claim 1, furthermore having
second sealing means (150), which seal off an intermediate space between the shaft (310) and the first body (110), without blocking the outlets (138) of the line (130); wherein
the outlets (138) are arranged between the first sealing means (140) and the second sealing means (150).

4. The sealing device (100) according to claim 3, wherein the first sealing means (140) and/or the second sealing means (150) are configured as a stuffing box.

5. The sealing device (100) according to claim 1, furthermore having
a second plate-shaped body (410) with a second opening (420), which is suitable for being connected sealingly to the first body (110) on a side of the first body (110) facing away from the housing (200) such that the first opening (120) and the second opening (420) overlap one another and allow the shaft (310) to be guided through them; wherein
the second opening (420) is suitable for the introduction of second sealing means (150) such that the second sealing means (150) seal off an intermediate space between the shaft (310) and the second body (410) without blocking the outlets (138) of the line (130).

6. The sealing device (100) according to claim 1, wherein the first body (110) has a third opening (160) which is suitable for the leadthrough of a further shaft (320).

7. The sealing device (100) according to claim 6, furthermore having
a third body (510) which is constructed like the first body (110) and is suitable to be connected sealingly to the first body (110) such that the first opening (120) of the first body (110) overlaps with the third opening (560) of the third body (510) and permits the feedthrough of the shaft (310), and that the third opening (160) of the first body (110) overlaps with the first opening (520) of the third body (510) and permits a feedthrough of the further shaft (320).

8. An extrusion device, having
an extrusion screw, mounted rotatably in a housing (200) by means of a shaft (310); and
a sealing device (100) according to claim 1 for sealing off the intermediate space between the housing (200) and the shaft (300).

9. A multi-screw extrusion device, having
two extrusion screws, mounted rotatably in a housing (200) by means of a first shaft (310) and a second shaft (320); and
a sealing device (100) according to claim 6 for sealing off the intermediate space between the housing (200) and the first shaft (310) and the second shaft (320).

10. A method for producing a sealing device according to claim 1, comprising:
producing the first body by means of an additive production method by means of 3D printing.

11. A computer program product which, on execution on a device for additive manufacture, causes the device for additive manufacture to carry out the method of claim 10.

* * * * *